H. P. DWYER.
CONTAINER FOR EGGS AND THE LIKE.
APPLICATION FILED FEB. 2, 1916.
1,225,704.
Patented May 8, 1917.
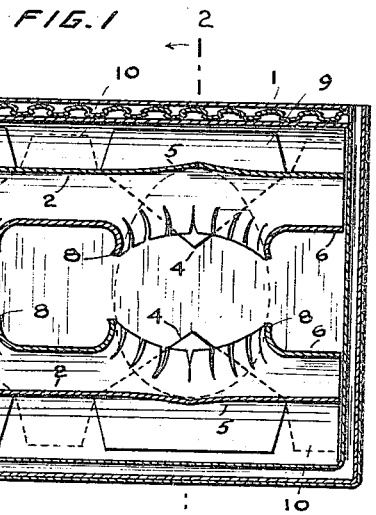
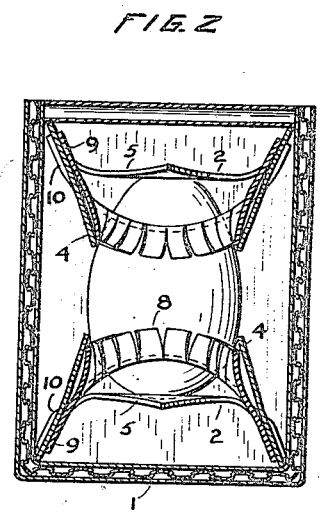
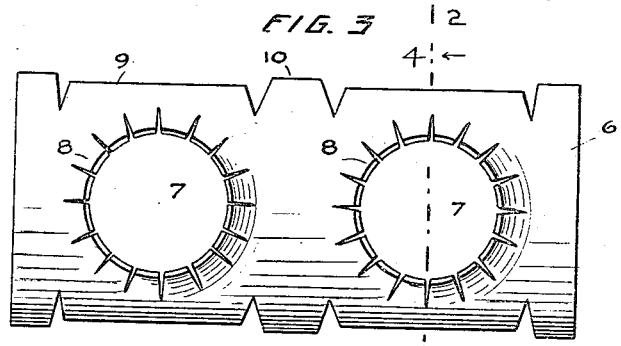
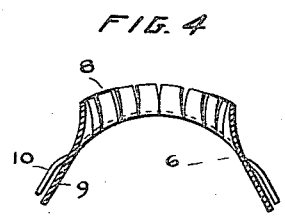
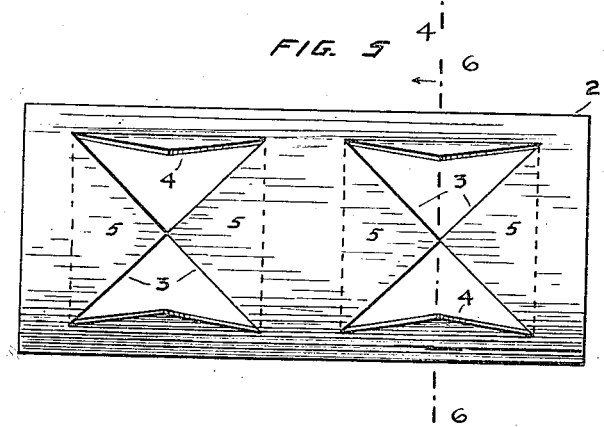
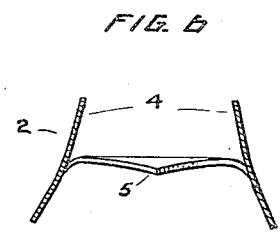
INVENTOR
HENRY P. DWYER
BY *F. M. Wright*
ATTY.

UNITED STATES PATENT OFFICE.

HENRY P. DWYER, OF SAN FRANCISCO, CALIFORNIA.

CONTAINER FOR EGGS AND THE LIKE.

1,225,704.　　　　　Specification of Letters Patent.　　Patented May 8, 1917.

Application filed February 2, 1916. Serial No. 75,643.

*To all whom it may concern:*

Be it known that I, HENRY P. DWYER, a citizen of the United States, residing at San Francisco, in the county of San Francisco and State of California, have invented new and useful Improvements in Containers for Eggs and the like, of which the following is a specification.

The present invention relates to improvements in shipping containers for the transportation of eggs, incandescent lamps, and other fragile articles, and the object of the invention is to provide a shipping container which will be cheap and simple in construction and in which the eggs or other articles will be so secured that it will be practically impossible to break them by any ordinary usage to which they are subjected in transportation.

In the accompanying drawing, Figure 1 is a longitudinal vertical section of a container; Fig. 2 is a transverse section thereof on the line 2—2 of Fig. 1; Fig. 3 is a plan view of an inner support detached; Fig. 4 is a transverse section thereof on the line 4—4 of Fig. 3; Fig. 5 is a plan view of an outer support; Fig. 6 is a transverse section on the line 6—6 of Fig. 5.

Referring to the drawing, 1 indicates a box, preferably rectangular in form and of any preferred construction.

I have herein, for the sake of simplicity of illustration, shown a box adapted to contain two eggs only, one only of the eggs being in place, but it will be understood that the boxes may be made of sufficient size to contain one dozen or more eggs. However, in the case of incandescent lamps, there will in general be only one lamp in each box, although more can be used if found desirable.

Against two opposite sides of the box, which I shall term its top and bottom, rest outer supports 2, made of card-board of suitable quality and thickness. Cuts 3 are made in the card-board along the diagonals of squares, there being one square for each egg to be contained in the box, in the present instance two such squares being shown. There are thus formed for each outer support four right-angled triangular pieces 4, 5, of which two opposite pieces 4 are bent upwardly, while the other two opposite pieces 5 remain in the same plane as the support. The outer support 2 is then bent into an arched form, as clearly shown in Fig. 6. The supports 2 are placed in the box so that the ends of each arch rest against the top or bottom of the box.

6 indicates an inner support of the same size and originally of the same shape as the outer support. It is also made of cardboard of suitable quality and thickness and is formed with holes 7 to receive ends of eggs and the material around each hole is formed to have a fringe-like edge 8 by cutting therein short radially extending slits and then bending upwardly the pieces separated from each other by the slits. Said inner support is formed along opposite sides with wide tongues 9 and narrow tongues 10, and it is also arched by bending upwardly the central portion thereof. The purpose of the tongues 9 and 10 is to secure the inner and outer supports together, and with this end the inner support rests upon the outer support, and its wide tongues 9 are passed beneath the upwardly bent portions 4 of the outer support, while the narrow tongues 10 are passed between said portions. It will be seen that, if this is done on both sides of the support, the inner support will be securely fastened to the outer support against ordinary displacement.

This construction is of great importance. The inner and outer supports thus placed together form a compound holder which is placed in the box so that its straight edges lie in contact with the bottom of the box close to the sides thereof, and press against said sides, and the resistance of the sides to the edge of the compound holder serves to retain the holder in its arched form.

The holder is now ready to receive the egg or lamp, and one end of each egg or lamp is placed within the fringed margin 8 of a corresponding hole 7 in the inner holder. When the eggs or lamps are in position another compound holder of exactly the same form and construction is placed over the other ends of the eggs or lamps. If other layers of eggs are to be transported in the box, a sheet of cardboard is laid over the top of the first layer, and may be said to form a new bottom for the box, and the operation is repeated for each layer. The box is then closed and is ready for transportation.

It has been found that eggs are supported in a container of the above construction so resiliently that it is possible to throw the container about a room or drop it from a height of eight feet or more without breakage of the eggs. This protective property of the container is due to several causes. In the first place, the fringed margins around the holes readily yield against pressure and again contract when the pressure is removed. The upwardly bent pieces 4 also form resilient supports for the eggs while the pieces 5, which are not bent upwardly, form resilient supports for the extreme ends of the eggs. Another important cause of the great resiliency of the container is the construction of the double arch formed by the inner and outer supports secured to each other at the edges and spaced from each other at the middle portions, the inner support being more arched than the outer. Both arches form yielding supports and the complete arch thus formed provides a yielding support of great strength.

Another important result accruing from my invention is that the fringed margin readily accommodates itself to the different sizes of eggs, expanding for a large egg and remaining contracted for a small egg.

While I have herein, for the sake of brevity of description, spoken of the device as being adapted to support eggs or lamps, it is to be understood that it is intended for yieldingly supporting any articles of a fragile character for which it is found suitable.

I claim:—

1. A container for fragile articles comprising a case, and an arched support therein having a hole therethrough for receiving an end of the article and the ends of the arch are supported against pressure perpendicular to its base and cut out to form tongues part of which extend outwardly and part inwardly from the arch.

2. A container for fragile articles comprising a box or case, and a compound arch-shaped member comprising two arch-shaped members secured together at their edges, the outer arch-shaped member having a recess to receive the article, and the inner arch-shaped member being curved less than the outer arch-shaped member.

3. A container for fragile articles comprising a box or case, and a compound arch-shaped member comprising two arch-shaped members secured together at their edges, an outer arch-shaped member having tongues extending therefrom and an inner arch-shaped member having in its margin tongues to engage the tongues of the other arch-shaped member.

4. A container for fragile articles comprising a box or case, and a compound arch-shaped member comprising two arch-shaped members secured together at their edges, an outer arch-shaped member having tongues extending therefrom and an inner arch-shaped member having in its margin tongues to engage the tongues of the other arch-shaped member, and having also a tongue extending between the tongues of the outer arch-shaped member.

5. A container for fragile articles comprising a box or case, and an arched support cut out to form outwardly extending tongues to engage the sides of the article and tongues to engage the end of the article.

In testimony whereof I have hereunto set my hand in the presence of two subscribing witnesses.

HENRY P. DWYER.

Witnesses:
F. M. WRIGHT,
D. B. RICHARDS.